UNITED STATES PATENT OFFICE.

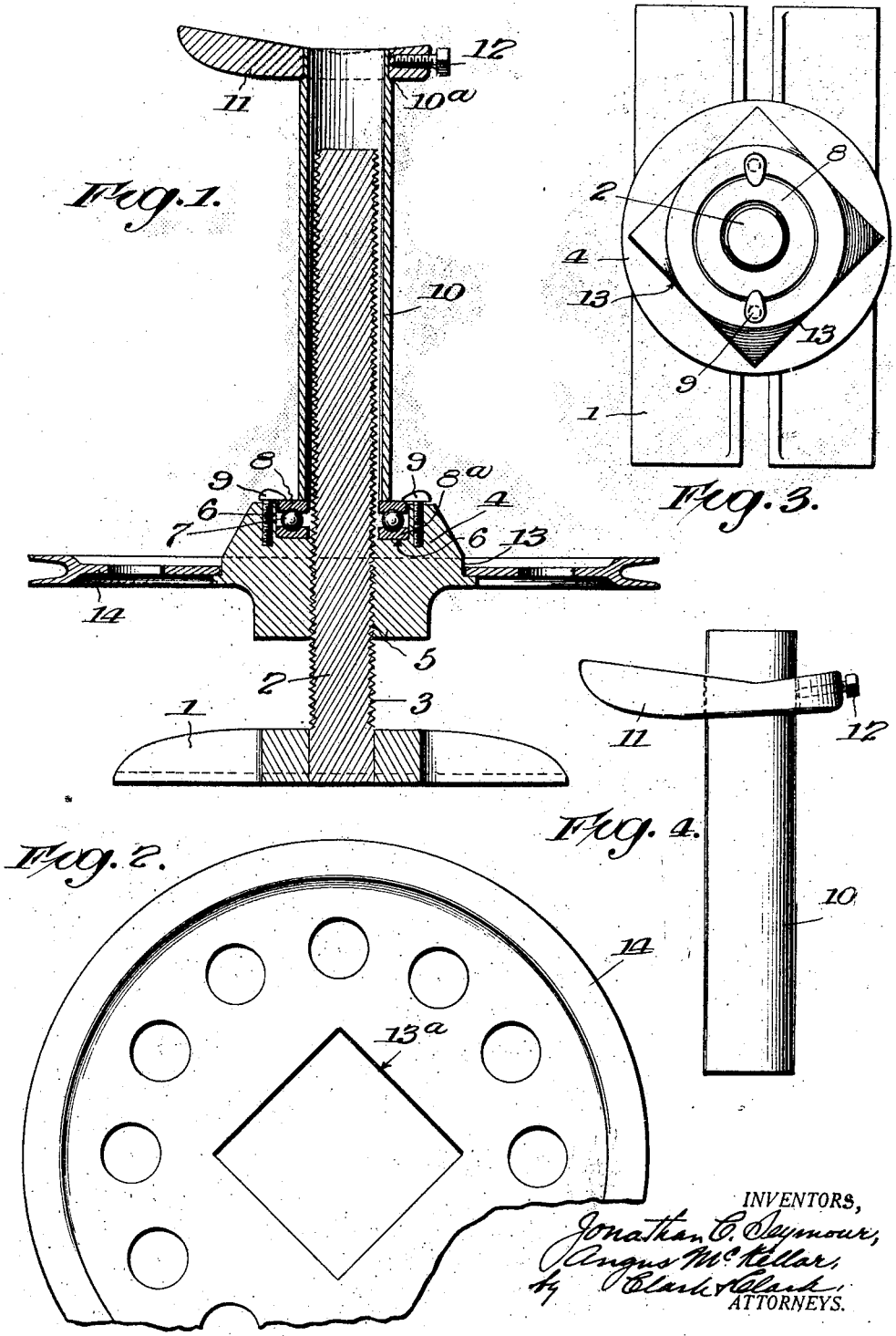

JONATHAN C. SEYMOUR AND ANGUS McKELLAR, OF SALT LAKE CITY, UTAH.

JACK.

1,382,682.

Specification of Letters Patent. Patented June 28, 1921.

Application filed May 7, 1920. Serial No. 379,503.

*To all whom it may concern:*

Be it known that we, JONATHAN C. SEYMOUR and ANGUS McKELLAR, citizens of the United States, residing at Salt Lake City, in the county of Salt Lake and State of Utah, have invented new and useful Improvements in Jacks, of which the following is a specification.

This invention relates in general to jacks, and in particular to jacks for use with automobiles.

One object of the invention is to provide a light weight, but powerful jack, in which friction between the load engaging parts and the base member or adjustable member is largely eliminated. The details of construction which make this result possible include particular features involving the use of anti-friction elements, such as ball or roller bearings, and the particular shape and relative position of the assembled parts.

Another object of the invention is to provide, in combination with the foregoing features, a knock-down jack which may be sufficiently powerful for any work and which is peculiarly adapted for use with automobile tool kits. The details described hereinafter provide for the particular configuration and mounting of the parts which complete a powerful jack, which may be quickly collapsed for packing in the limited storage space of an automobile tool box.

Details of the above mentioned features are described in the following specification and claims and illustrated in the accompanying drawings, in which—

Figure 1 is a vertical sectional view of the jack showing the hub member screw threaded to the main standard, showing the balls in the raceway in the hub, and illustrating the detachable work supporting member mounted on the balls, and the detachable wheel mounted on the hub for turning the same;

Fig. 2 is a top plan view, partly broken away, showing the rectangular central opening which is adapted to engage the rectangular portion of the hub periphery;

Fig. 3 is a top plan view of the hub member, main standard and base, with the work supporting member and operating wheel removed;

Fig. 4 is a front elevation of the work supporting member removed from the main portion of the jack.

Referring in detail to the drawings, 1 indicates the base of the jack having a central opening therein for the reception of an upright supporting standard 2, which is provided along its length with screw threads 3, which latter have preferably a very low pitch. Mounted on the standard 2 is the adjustable hub member 4 having a central opening with screw threads 5 adapted to engage with the screw threads 3 of the standard 2. In the upper surface of the hub member 4 is a raceway 6 for the reception of anti-friction means indicated by ball bearings 7. These balls, as illustrated, rest on a lower supplemental raceway 7ª, and immediately above the balls is an upper retaining member having a groove in its under surface, which is indicated by 8. This member 8 has a loose fit with the hub member 4 and the top surface is substantially level with the surface of the hub member. Screws 9, having extending heads, are secured to the hub member 4, so that their heads project over the edge of the retaining member 8 to prevent loss of the balls 7. Immediately above the retaining member 8 and encircling the upper end of the standard 2 is a tubular work supporting member 10, the lower end of which rests on the member 8 and thereby applies the weight of the work directly to the anti-friction units 7 in the raceway 6. At the top of the detachable work supporting member 10 is a work contact or positioning member 11, which is secured to the member 10 by means of a set screw 12 and which is illustrated as resting on a shoulder 10ª, formed at the upper end of the member 10 to receive the weight of the load. If desired, the part 11 and the part 10 could be formed in one piece, in which case the shoulder 10ª would be dispensed with, and the set screw 12 unnecessary.

In order to provide for the quick detachable and knock-down features, so that the jack may be sufficiently compact to readily be packed in an automobile tool box, and still be sufficiently powerful, the invention provides that the hub portion 4 have an irregular periphery as indicated at 13, where it is shown as rectangular. Lever means for operating the jack are indicated by the wheel 14, which has a centrally located rectangular opening 13ª adapted to fit over and engage the rectangular contour 13 of the periphery of the hub member 4.

The construction described has made it possible to produce a jack in which there is remarkably little friction due to the location and use of the anti-friction means. It has been found that unusually little power is required because of the coöperation of the anti-friction means with the tremendous force which may be had by means of the use of screw threads between the adjustable hub member and the main supporting standard. The knock-down features have proved of considerable value because it is thus possible to remove the lever means from the hub portion and to pack the jack in very small space, the wheel being relatively thin and lying flat against the side wall of the tool box of the automobile in which it is stored.

What we claim is:

1. A jack comprising a base, a primary supporting stand thereon, a movable member adjustably mounted on said standard and having an annular raceway, anti-friction units for said raceway, power applying means adapted to coöperate with said movable member, and a supplemental standard mounted for coöperation with said anti-friction units and freely rotatable thereon and extending directly therefrom as a rigid spacing member to engage work.

2. A jack comprising a base, a primary supporting standard thereon, a movable member adjustably mounted on said standard and having an annular raceway formed on its upper side, anti-friction units for said raceway, power applying means adapted to coöperate with said movable member, and a supplemental standard mounted for coöperation with said anti-friction units and freely rotatable thereon and extending directly therefrom as a rigid spacing member to engage work, said supplemental standard being free to rotate with respect to said power applying means.

3. A jack comprising a base, a primary supporting standard thereon, a movable member adjustably mounted on said standard and having an annular raceway formed on its upper side, anti-friction units for said raceway, and a supplemental standard adapted to engage work and having a tubular portion encircling said primary standard and with the lower end thereof directly above and supported by said anti-friction units and extending directly therefrom as a rigid spacing member to engage work.

4. A jack comprising a base, a primary screw-threaded supporting standard having its lower end fixed in said base, a screw-threaded movable member adjustably mounted on said standard and in screw-threaded engagement therewith and having an annular raceway formed on its upper side, anti-friction units for said raceway, a cover member for said anti-friction units resting on the same, and a supplemental standard resting on said cover member and extending directly as a rigid spacing member to engage work.

5. A jack comprising a base, a primary screw-threaded supporting standard having its lower end fixed in said base, a screw-threaded movable member adjustably mounted on said standard and in screw-threaded engagement therewith and having an annular raceway formed on its upper side, anti-friction units for said raceway, a cover member for said anti-friction units resting on the same, releasable securing means for retaining said cover member on said anti-friction units, and a supplemental standard resting on said cover member and extending directly as a rigid spacing member to engage work.

6. A jack comprising a base, a primary supporting standard thereon, a movable member adjustably mounted on said standard and having an annular raceway formed in its upper surface, anti-friction units for said raceway, a cover member for said anti-friction units resting on the same and having its upper surface substantially level with the upper surface of said movable member immediately adjacent said raceway.

7. A knock-down jack comprising a base, a standard thereon, an adjustable member on said standard, work supporting means mounted in coöperation with said adjustable member, and work positioning means on said work supporting means including a contact member to engage work, and securing means to fasten said contact member on said work supporting means and in any pre-determined position.

8. A knock-down jack comprising a base, a screw threaded standard mounted thereon, an adjustable hub member screw threaded to said standard and having an irregular outer periphery, detachable power applying means having an opening, the edges of which latter are adapted to engage and fit the irregular periphery of said hub member, and work supporting means mounted for coöperation with said hub member.

9. A knock down jack comprising a base, a screw threaded standard mounted thereon, an adjustable hub member screw threaded to said standard and having an irregular outer periphery, a detachable power applying wheel having an opening, the edges of which latter are adapted to engage and fit the irregular periphery of said hub member, and work supporting means mounted for coöperation with said hub member.

10. A knock-down jack comprising a base, a screw threaded standard mounted thereon, an adjustable hub member screw threaded to said standard and having an irregular outer periphery, detachable power applying lever means adapted to engage said hub member, and having a portion adapted to coöperate with a coöperating part of said hub member to prevent relative lateral or circumferential movement of these parts, and work supporting means mounted for coöperation with said hub member.

11. A knock-down jack comprising a base, a screw threaded standard mounted thereon, an adjustable hub member screw threaded to said standard and having an annular raceway formed in its upper surface, and an irregular lateral periphery, anti-friction units in said raceway, a cover member for said anti-friction units resting on the same, work supporting means resting on said cover member, and detachable power applying lever means adapted to engage said hub member and having a part adapted to coöperate with a coöperating part of said hub member to prevent relative circumferential movement of these parts.

In testimony whereof we affix our signatures.

JONATHAN C. SEYMOUR.
ANGUS McKELLAR.